United States Patent Office 3,143,677
Patented Aug. 4, 1964

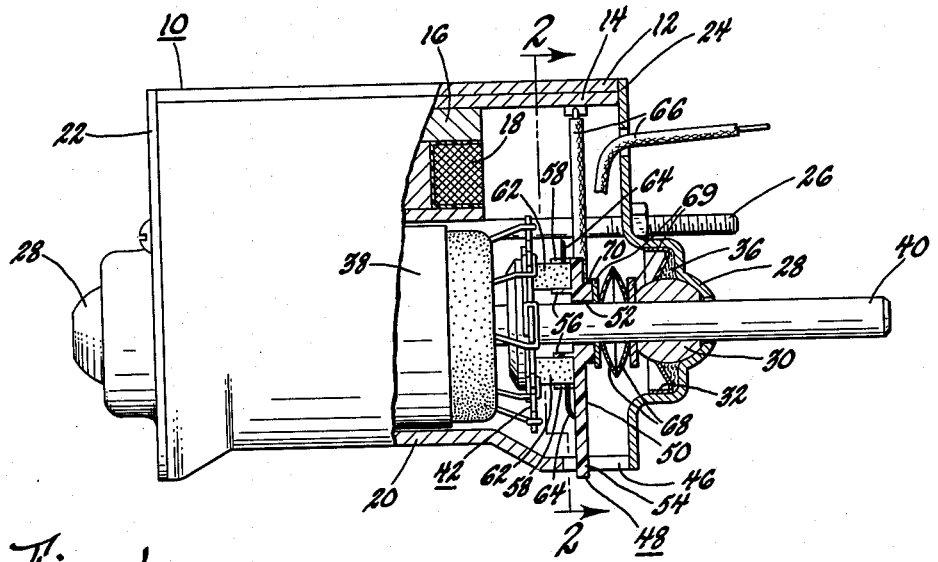
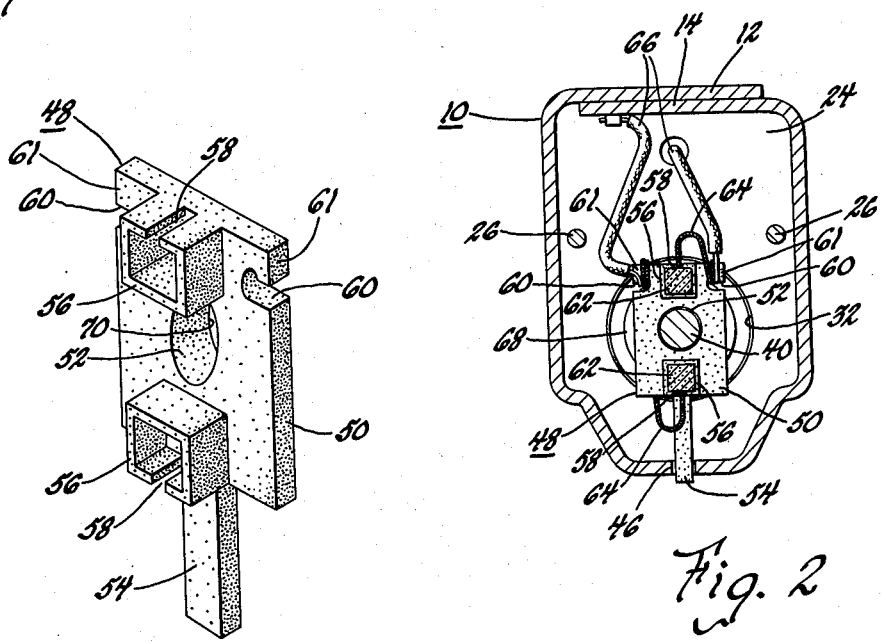

3,143,677
BRUSH HOLDER ASSEMBLY
Paul S. Heiler, Rochester, N.Y., assignor to General Motors Corporation, Detroit, Mich., a corporation of Delaware
Filed Apr. 9, 1962, Ser. No. 185,920
6 Claims. (Cl. 310—239)

This invention pertains to dynamoelectric machines, and particularly to an improved current collector means, or brush holder assemblies, for electric motors.

In recent years direct current motors of the general type shown in Simmons et al. Patent 3,021,444 embodying a substantially rectangular frame configuration, have come into wide use for operating automotive accessories, such as windshield wipers, window lifts and seat actuators. The present invention relates to a simplified and more economical brush holder assembly for motors of this general type adapted for use with disc, or face-type, commutators. Accordingly, among my objects are the provision of an integral brush plate and brush box assembly composed of insulating material; the further provision of a brush holder of the aforesaid type especially designed for use with radial commutators; and the still further provision of means for mounting an integral plastic brush plate and brush box assembly in a rectangular frame motor.

The aforementioned and other objects are accomplished in the present invention by embodying integral lug means of the brush plate and brush box assembly, which lug means are interlocked with the motor frame to restrain rotation thereof, in combination with spring means for urging the entire brush holder assembly axially towards an associated current collector member. Specifically, the improved brush plate and brush box assembly is disclosed in combination with an armature having a radial commutator, and wherein the armature is mounted in a substantially rectangular motor frame. The brush plate and brush box assembly comprises an integral molded plastic member having radially extending lug adapted to project through a slot in a motor frame so as to preclude relative rotation therebetween. The integral brush plate and brush box assembly has a central aperture designed to receive the armature shaft, and a pair of integral molded brush boxes are adapted to support brushes for engagement with the disc commutator. The entire brush plate and brush box assembly is maintained in engagement with the commutator by a spring washer assembly surrounding the armature shaft.

Further objects and advantages of the present invention will be apparent from the following description, reference being had to the accompanying drawings, wherein a preferred embodiment of the present invention is clearly shown.

In the drawing:
FIGURE 1 is a side view, partly in section and partly in elevation, of a dynamoelectric machine having the improved brush holder assembly of this invention.
FIGURE 2 is a sectional view taken along line 2—2 of FIGURE 1.
FIGURE 3 is an isometric view of the improved integral brush plate and brush box assembly.

With reference to FIGURE 1, the improved brush holder assembly is shown in combination with a direct current electric motor having a substantially rectangular frame 10 with overlapped end portions 12 and 14, the overlapped end portions 12 and 14 being suitably secured together and supporting a pole piece 16 having a winding 18. A second pole 20 for the motor is formed by an inwardly depressed arcuate portion opposite the pole piece 16.

The open ends of the frame 10 are closed by end caps 22 and 24, the end caps being held in assembled relation with the frame 10 by a pair of tie bolts 26. As shown, each end plate 22 and 24 is formed with an integral depression having a partially spherical surface 28 for supporting a self-aligning bearing 30. The self-aligning bearing 30 is held in assembled relation with the end cap by a bearing retainer 32 which is spot welded to the end cap. A lubricant impregnated felt packing 36 is interposed between the retainer 32 and the end cap for supplying lubricant to the self-aligning bearing 30.

A conventional wound armature 38 has its shaft 40 journalled in the self-aligning bearings of the end caps 22 and 24. The armature includes a current collector member, or commutator, 42 having a plurality of spaced apart segments to which the armature windings are electrically connected. In the present instance, the commutator 42 is of the disc, or face, type.

Referring more particularly to FIGURES 2 and 3, the frame 10 is formed with an elongate open slot 46 adjacent the commutator end thereof, which slot is closed by the end cap 24. An integral molded brush holder assembly 48, composed of any suitable insulating plastic, is disposed between the bearing 30 and the commutator 42. The brush holder assembly 48 comprises a brush plate 50 having a central aperture 52 through which the armature shaft 40 extends. The plate 50 has an integral radially extending lug 54 adapted to project through the frame slot 46 so as to restrain rotation of the brush holder assembly while permitting axial movement relative thereto. The plate 50 is formed with a pair of integral axially extending, substantially rectangular brush boxes 56, each brush box having a side wall slot 58 for accommodating a brush pigtail. In addition, the brush plate 50 is formed with a pair of peripheral notches 60 for supporting the lead wires and the brush pigtails.

Each brush box 56 receives a substantially rectangular brush 62 which projects therefrom for engagement with the radial segments of the disc commutator 42. Each brush has a pigtail 64 which is secured to a lead wire 66 by soldering, both the lead wires and the pigtails being wrapped around the tabs 61 formed by the notches 60. A pair of spring thrust washers 68 and a pair of flat washers 69 are mounted between the bearing 30 and an integral boss 70 on the brush plate 50, as seen in FIGURE 1. The spring washers 68 bias the entire brush holder assembly towards the commutator 42, and thus maintain the brushes 62 in electrical contact, under spring bias, with the commutator segments.

From the foregoing it is manifest that the present invention discloses an extremely simple and economical brush holder assembly especially adapted for use with motors having face-type commutators. The brush holder assembly can be assembled with the motor in an easy and straight forward manner without any fastening devices and is freely floatable axially under spring pressure to achieve good electric contact with the current collector member. Moreover, the brush assembly of this invention can also be used with electric motors having annular type commutators by the inclusion of brush springs within radially extending brush boxes.

While the embodiment of the invention as herein disclosed constitutes a preferred form, it is to be understood that other forms might be adopted.

What is claimed is as follows:
1. In a dynamoelectric machine having a frame and a current collector member rotatably supported within said frame, an integral brush plate and brush box assembly of insulating material operatively connected to said frame so as to be restrained against rotation relative thereto although capable of axial movement relative to said frame, said assembly including a pair of integral brush boxes, a brush disposed in each brush box for engagement with said current collector member, and spring means biasing said assembly axially into engagement with said current collector member.

2. A brush plate and brush box assembly for a dynamoelectric machine including, a one-piece molded member of insulating material having a shaft receiving opening, a pair of brush boxes having side wall, pigtail receiving slots, integral pigtail and lead wire supporting tab means, and an integral radially extending, rotation restraining lug.

3. In a dynamoelectric machine having a frame and a current collector member attached to a shaft rotatably supported within said frame, a one-piece molded insulating member having a shaft receiving opening, a pair of brush boxes and an integral radially extending lug, said frame having an elongate, axially extending slot for receiving said lug so as to restrain rotation of said member relative to said frame, a brush disposed in each brush box for engagement with said current collector member, and spring means surrounding said shaft and engaging said member for biasing said member axially into engagement with said current collector member.

4. In a dynamoelectric machine having a frame and a pair of end caps enclosing the ends of said frame, an armature having a shaft journalled in said end caps and carrying a current collector member, an integral brush plate and brush box assembly of insulating material having radially extending lug means, a pair of brush boxes and a shaft receiving opening, said frame having an elongate axial slot means receiving said lug means for restraining rotation of said assembly relative to said frame, a brush disposed in each brush box for engagement with said current collector member, and a spring washer assembly reacting between one of said end caps and said assembly for biasing said assembly axially into engagement with said current collector member.

5. In a dynamoelectric machine having a frame, a pair of end caps closing the open ends of said frame and an armature having a shaft rotatably journalled in said end caps and carrying a disc commutator, an integral brush plate and brush box assembly of insulating material having a radially extending lug, a pair of axially extending brush boxes and a shaft receiving opening, said frame having an elongate, axial slot means receiving said radially extending lug to preclude rotation of said assembly relative to said frame, a brush disposed in each brush box for engagement with said disc commutator, and spring means reacting between one of said end caps and said assembly for biasing said assembly axially into engagement with said disc commutator.

6. The integral brush plate and brush box assembly set forth in claim 5 wherein said brush boxes project axially from one side of said brush plate, wherein said brush plate includes an integral boss projecting axially from the opposite side of said brush plate, and wherein said spring means comprises a spring washer assembly surrounding said shaft and reacting between said one end cap and said boss.

References Cited in the file of this patent

UNITED STATES PATENTS

| Number | Name | Date |
| --- | --- | --- |
| 1,072,847 | Gordon | Sept. 9, 1913 |
| 1,158,457 | Dey | Nov. 2, 1915 |
| 1,205,136 | Holmes | Nov. 14, 1916 |
| 2,436,540 | Allenby | Feb. 24, 1948 |
| 2,763,800 | Curley | Sept. 18, 1956 |

FOREIGN PATENTS

| Number | Country | Date |
| --- | --- | --- |
| 284,673 | Great Britain | Aug. 16, 1928 |